United States Patent
Li et al.

(10) Patent No.: US 12,322,772 B2
(45) Date of Patent: Jun. 3, 2025

(54) METHODS FOR PREPARING SUPPORTED CATALYSTS USING WASTE LITHIUM BATTERIES AND ATTAPULGITE

(71) Applicant: CHANGZHOU UNIVERSITY, Jiangsu (CN)

(72) Inventors: Xiazhang Li, Changzhou (CN); Taoli Huhe, Changzhou (CN); Jiyi Zeng, Changzhou (CN); Shixiang Zuo, Changzhou (CN); Xuhua Ye, Changzhou (CN); Xiaofei Yin, Changzhou (CN); Chao Yao, Changzhou (CN); Haoguan Gui, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/959,575

(22) Filed: Nov. 25, 2024

(65) Prior Publication Data
US 2025/0087778 A1   Mar. 13, 2025

Related U.S. Application Data

(63) Continuation of application No. PCT/CN2024/090548, filed on Apr. 29, 2024.

(30) Foreign Application Priority Data

Aug. 25, 2023 (CN) .......................... 202311088242.6

(51) Int. Cl.
| | |
|---|---|
| *H01M 10/54* | (2006.01) |
| *B01J 23/75* | (2006.01) |
| *B01J 37/00* | (2006.01) |
| *B01J 37/08* | (2006.01) |
| *B01J 37/32* | (2006.01) |

(52) U.S. Cl.
CPC ............. *H01M 10/54* (2013.01); *B01J 23/75* (2013.01); *B01J 37/0072* (2013.01); *B01J 37/082* (2013.01); *B01J 37/32* (2013.01)

(58) Field of Classification Search
CPC ...... H01M 10/54; B01J 23/75; B01J 37/0072; B01J 37/082; B01J 37/32
USPC ..................... 429/49; 502/325, 350
See application file for complete search history.

(56) References Cited

U.S. PATENT DOCUMENTS

| | | | | |
|---|---|---|---|---|
| 9,947,964 B2 * | 4/2018 | Hatta | .................... | B60W 20/13 |
| 2021/0359337 A1 * | 11/2021 | Tang | .................... | C01G 35/006 |
| 2021/0391568 A1 | 12/2021 | Zhang et al. | | |
| 2024/0274914 A1 * | 8/2024 | Do | .......................... | C22B 3/165 |

FOREIGN PATENT DOCUMENTS

| | | | | |
|---|---|---|---|---|
| CN | 105727938 A | | 7/2016 | |
| CN | 111137902 A | * | 5/2020 | ............. C01B 33/38 |
| CN | 112779421 A | * | 5/2021 | ............. C22B 1/005 |
| CN | 113117637 A | | 7/2021 | |
| CN | 113549765 A | | 10/2021 | |
| CN | 115558516 B | | 9/2023 | |
| CN | 117138789 A | | 12/2023 | |
| WO | 2013123746 A1 | | 8/2013 | |
| WO | WO-2024170011 A1 | * | 8/2024 | ............. B01D 53/02 |

OTHER PUBLICATIONS

English translation of Written Opinion for PCT/CN2024/090548. (Year: 2024).*
International Search Report in PCT/CN2024/090548 mailed on Jun. 20, 2024, 6 pages.
Written Opinion in PCT/CN2024/090548 mailed on Jun. 20, 2024, 6 pages.

* cited by examiner

*Primary Examiner* — Patricia L. Hailey
(74) *Attorney, Agent, or Firm* — Porus IP LLC (57) ABSTRACT

A method for preparing a supported catalyst, including mixing waste lithium battery cathode material and biomass uniformly to obtain a mixture, then putting the mixture into a tube furnace for nitrogen purging, and then heating and calcining to obtain a solid sample after carbothermal reduction treatment; hydrothermally stirring the solid sample, followed by filtration to recover a residue, and drying the residue to obtain a mixed sample of $Co_3O_4$, $TiO_2$, and biochar, labeled as TCO; ultrasonically dispersing the attapulgite in an acid solution, stirring in a water bath at 80° C. to obtain a product, washing the product until neutral, filtering, and then drying to obtain an acidified attapulgite (H-ATP); and weighing the TCO, ultrasonically dispersing the TCO in a mixed solution of deionized water and N, N dimethylformamide (DMF), adding the H-ATP into the mixed solution, and performing a microwave hydrothermal reaction, obtaining a sample after centrifuging, washing, and drying, and then performing muffle calcination on the sample to obtain the supported catalyst $Co_3(Ti)O_4$/H-ATP.

9 Claims, 4 Drawing Sheets

METHODS FOR PREPARING SUPPORTED CATALYSTS USING WASTE LITHIUM BATTERIES AND ATTAPULGITE

CROSS-REFERENCE TO RELATED APPLICATIONS

This application is a Continuation of International Application No. PCT/CN2024/090548, filed on Apr. 29, 2024, which claims priority to Chinese Patent Application No. 202311088242.6, filed on Aug. 25, 2023, the entire contents of each of which are hereby incorporated by reference.

TECHNICAL FIELD

The present disclosure relates to the technical field of solid waste resource utilization, and in particular, to a method for preparing a supported catalyst using a waste lithium battery and attapulgite.

BACKGROUND

Excessive $CO_2$ concentration in the atmosphere causes global warming, and it is important to utilize photothermal synergistic catalysis to convert $CO_2$ and water into excellent chemicals and fuels. Currently, the development of low-cost and high-efficiency photothermal catalytic systems focuses on the design and preparation of new materials capable of effectively capturing and activating $CO_2$, and the new materials are also capable of generating electrons and holes with strong redox capacity in an appropriate conduction band and valence band positions, and ultimately converting $CO_2$ into a variety of high value-added carbon-containing products according to the corresponding reduction potential.

Attapulgite (ATP) is a natural clay mineral rich in magnesium and aluminum, which is an excellent solid adsorbent material due to abundant resources, abundant pore structure, and stable chemical properties. The ATP is often used as a catalyst carrier due to its abundant active centers. Waste lithium battery contains valuable metals such as cobalt and lithium, and the $Co_3O_4$ obtained after reduction is an excellent candidate catalyst for $CO_2$ conversion, but the intrinsic activity of the $Co_3O_4$ catalyst is still low.

Therefore, there is a need to provide a method for preparing a supported catalyst using waste lithium battery and attapulgite to obtain a highly active and robust catalyst, thereby improving the efficiency of $CO_2$ conversion.

SUMMARY

One or more embodiments of the present disclosure provide a method for preparing a supported catalyst using waste lithium battery and attapulgite. The method includes:
(a) performing pre-treatment including discharging, aluminum foil stripping, and sieving on waste lithium battery cathode material before putting into an oven for drying and spare;
(b) freeze-drying waste biomass, after removal, grinding and sieving on the freeze-dried waste biomass for spare;
(c) mixing the dried waste lithium battery cathode materials in step (a) and the sieved biomass in step (b) uniformly to obtain a mixture, then putting the mixture into a tube furnace for nitrogen purging, and then heating and calcining, to obtain a solid sample after carbothermal reduction treatment;
(d) hydrothermally stirring the solid sample after the carbothermal reduction treatment, followed by filtration to recover a residue, and drying the residue to obtain a mixed sample of $Co_3O_4$, $TiO_2$, and biochar, labeled as TCO;
(e) ultrasonically dispersing the attapulgite in an acid solution for modification and stirring in a water bath at 80° C. to obtain a product, washing the product until neutral, filtering, and then drying in the oven overnight to obtain an acidified attapulgite (H-ATP); and
(f) weighing the TCO, ultrasonically dispersing the TCO in a mixed solution of deionized water and N, N dimethylformamide (DMF), adding the H-ATP into the mixed solution, and performing a microwave hydrothermal reaction, obtaining a sample after centrifuging, washing, and drying, and then performing muffle calcination on the sample to obtain a supported catalyst Co3(Ti)O4/H-ATP.

In some embodiments, the waste lithium battery cathode material in step (a) is a lithium secondary battery cathode material of a rechargeable treasure or a cell phone battery, and a composition of the lithium secondary battery cathode material includes $LiCoO_2$ and $Li_4Ti_5O_{12}$.

In some embodiments, the waste biomass in step (b) includes at least one of an onion, a lotus leaf, and a pomegranate peel, a temperature of the freeze-drying is within a range of $(-60)-(-30)$° C., and a time of the freeze-drying is within a range of 6-12 h.

In some embodiments, a mass ratio of the dried waste lithium battery cathode material and the sieved biomass in step (c) is 1:(0.2-0.7), a time of the nitrogen purging is within a range of 10-20 min, a heating rate of the heating and calcining is within a range of 2-15° $C \cdot min^{-1}$, and a temperature of the carbothermal reduction treatment is within a range of 500-700° C.

In some embodiments, a time of the hydrothermal stirring in step (d) is within a range of 5-15 h, and a temperature of the hydrothermal stirring is within a range of 60-80° C.

In some embodiments, the acid solution for modification in step (e) includes at least one of hydrochloric acid, nitric acid, and phosphoric acid.

In some embodiments, the TCO in step (f) accounts for 10%-50% of a mass of the H-ATP, and a volume ratio of the deionized water to the DMF is 1:(10-30).

In some embodiments, a temperature of the microwave hydrothermal reaction in step (f) is within a range of 140-180° C., and a time of the microwave hydrothermal reaction is within a range of 60-120 min; and a temperature of the muffle calcination is within a range of 300-400° C., and a time of the muffle calcination is within a range of 60-180 min.

One or more embodiments of the present disclosure provide a supported catalyst prepared by the method described above. The supported catalyst is a $Co_3(Ti)O_4$/acidified attapulgite (H-ATP) composite.

BRIEF DESCRIPTION OF THE DRAWINGS

The present disclosure will be further illustrated by way of exemplary embodiments, which will be described in detail by means of the drawings. These embodiments are not limited, in which the same numbering denotes the same structure, wherein.

DETAILED DESCRIPTION

In order to more clearly illustrate the technical solutions of the embodiments of the present disclosure, the drawings required to be used in the description of the embodiments are briefly described below. Obviously, the drawings in the following description are only some examples or embodiments of the present disclosure, and it is possible for a person skilled in the art to apply the present disclosure to other similar scenarios according to these drawings without creative labor. Unless obviously obtained from the context or the context illustrates otherwise, the same numeral in the drawings refers to the same structure or operation.

As shown in the present disclosure and the claims, unless the context clearly suggests an exception, the words "a", and/or "the" do not refer specifically to the singular, but may also include the plural. In general, the terms "including" and "comprising" suggest only the inclusion of clearly identified steps and elements, which do not constitute an exclusive list, and the method or apparatus may also include other steps or elements.

Embodiments of the present disclosure provide a method for preparing a supported catalyst using waste lithium battery and attapulgite (ATP). The method utilizes waste biomass carbothermal reduction to recover a cobalt-titanium compound from the waste lithium battery and then synthesizes a Co$_3$(Ti)O$_4$/acidified attapulgite (H-ATP) catalyst using a microwave hydrothermal method. In this case, microwave-assisted hydrothermal induces Ti$^{4+}$-doped Co$_3$O$_4$, which subsequently leads to lattice defects in Co$_3$O$_4$, and H-ATP complexed with Co$_3$(Ti)O$_4$ produces a plasmonic resonance effect in the visible-near-infrared region of sunlight to achieve a full-spectrum absorption. In addition, H-ATP has a great specific surface area and abundant active centers for capturing CO$_2$ molecules, and the residual biochar produced by biomass reduction of waste lithium battery cathode material forms a charge transfer channel on the surface of the H-ATP to accelerate the transfer of electrons and enhance the CO$_2$ adsorption and conversion, realizing the transformation of waste to treasure.

Embodiments of the present disclosure provide a method for preparing a supported catalyst using waste lithium battery and attapulgite. The method includes the following steps:

(a) performing pre-treatment including discharging, aluminum foil stripping, and sieving on waste lithium battery cathode material (labeled LTCO) before putting into an oven for drying and spare;

In some embodiments, the waste lithium battery cathode material in step (a) may be a lithium secondary battery cathode material of a rechargeable treasure or a cell phone battery, and a composition of the lithium secondary battery cathode material may include lithium cobaltate (LiCoO$_2$) and lithium titanate (Li$_4$Ti$_5$O$_{12}$).

In some embodiments, after pre-treatment of the LTCO, a time of drying the LTCO in the oven may be within a range of 4-8 h.

(b) Freeze-drying waste biomass, after removal, grinding and sieving on the freeze-dried waste biomass for spare;

In some embodiments, the waste biomass may include at least one of an onion, a lotus leaf, and a pomegranate peel. For example, onion powder, lotus leaf powder, or pomegranate peel powder made from dried onions, lotus leaves, pomegranate peels, or the like.

In some embodiments, a temperature of the freeze-drying in step (b) may be within a range of (−60)-(−30)° C. In some embodiments, the temperature of freeze-drying in step (b) may be −60° C., −50° C., −40° C., −30° C., or the like.

In some embodiments, a time of the freeze-drying in step (b) may be within a range of 6-12 h. In some embodiments, the time of the freeze-drying in step (b) may be 6 h, 8 h, 10 h, 12 h, or the like.

(c) Mixing the dried waste lithium battery cathode material in step (a) and the sieved biomass in step (b) uniformly to obtain a mixture, then putting the mixture into a tube furnace for nitrogen purging, and then heating and calcining, to obtain a solid sample after carbothermal reduction treatment;

In some embodiments, a mass ratio of the dried LTCO and the sieved biomass in step (c) may be 1:(0.2-0.7). In some embodiments, the mass ratio of the dried LTCO and the sieved biomass in step (c) may be 1:0.2, 1:0.3, 1:0.4, 1:0.5, 1:0.6, 1:0.7, or the like.

In some embodiments, a time of the nitrogen purging in step (c) may be within a range of 10-20 min. In some embodiments, the time of the nitrogen purging in step (c) may be 10 min, 12 min, 14 min, 16 min, 18 min, 20 min, or the like.

In some embodiments, a heating rate of the heating and calcining in step (c) may be within a range of 2-15° C·min$^{-1}$. In some embodiments, the heating rate of the heating and calcining in step (c) may be 2° C·min$^{-1}$, 5° C·min$^{-1}$, 10° C·min$^{-1}$, 15° C·min$^{-1}$, or the like.

In some embodiments, a temperature of the carbothermal reduction treatment in step (c) may be within a range of 500-700° C. In some embodiments, the temperature of the carbothermal reduction treatment in step (c) may be 500° C., 600° C., 700° C., or the like.

(d) Hydrothermally stirring the solid sample after the carbothermal reduction treatment, followed by filtration to recover a residue, and drying the residue to obtain a mixed sample of Co$_3$O$_4$, TiO$_2$, and biochar, labeled as TCO;

In some embodiments, a time of the hydrothermal stirring of the solid sample after the carbothermal reduction treatment in step (d) may be within a range of 5-15 h. In some embodiments, the time of the hydrothermal stirring in step (d) may be 5 h, 8 h, 10 h, 13 h, 15 h, or the like.

In some embodiments, a temperature of the hydrothermal stirring of the solid sample after the carbothermal reduction treatment in step (d) may be within a range of 60-80° C. In some embodiments, the temperature of the hydrothermal stirring in step (d) may be 60° C., 65° C., 70° C., 75° C., 80° C., or the like.

(e) Ultrasonically dispersing the attapulgite in an acid solution for modification and stirring in a water bath at 80° C. to obtain a product, washing the product until neutral, filtering, and then drying in the oven overnight to obtain an acidified attapulgite (H-ATP);

In some embodiments, the acid solution for modification in step (e) may include at least one of hydrochloric acid, nitric acid, and phosphoric acid.

(f) weighing the TCO, ultrasonically dispersing the TCO in a mixed solution of deionized water and N, N dimethylformamide (DMF), adding the H-ATP into the mixed solution, and performing a microwave hydrothermal reaction, obtaining a sample after centrifuging, washing, and drying, and then performing muffle calcination on the sample to obtain a supported catalyst $Co_3(Ti)O_4$/H-ATP.

In some embodiments, the TCO in step (f) accounts for 10%-50% of a mass of the H-ATP. In some embodiments, the TCO in step (f) accounts for 10% of the mass of the H-ATP. In some embodiments, the TCO in step (f) accounts for 30% of the mass of the H-ATP. In some embodiments, the TCO in step (f) accounts for 50% of the mass of the H-ATP.

In some embodiments, a volume ratio of the deionized water to the DMF in step (f) may be 1:(10-30). In some embodiments, the volume ratio of the deionized water to the DMF in step (f) may be 1:10, 1:15, 1:20, 1:25, 1:30, or the like.

In some embodiments, a temperature of the microwave hydrothermal reaction in step (f) may be within a range of 140-180° C. In some embodiments, the temperature of the microwave hydrothermal reaction in step (f) may be 140° C., 150° C., 160° C., 170° C., 180° C., or the like.

In some embodiments, a time of the microwave hydrothermal reaction in step (f) may be within a range of 60-120 min. In some embodiments, the time of the microwave hydrothermal reaction in step (f) may be 60 min, 70 min, 80 min, 90 min, 100 min, 110 min, 120 min, or the like.

In some embodiments, a temperature of the muffle calcination in step (f) may be within a range of 300-400° C. In some embodiments, the temperature of the muffle calcination in step (f) may be 300° C., 350° C., 400° C., or the like.

In some embodiments, a time of the muffle calcination in step (f) may be within a range of 60-180 min. In some embodiments, the time of the muffle calcination in step (f) may be 60 min, 100 min, 140 min, 180 min, or the like.

In some embodiments, the $Co_3(Ti)O_4$/H-ATP supported catalyst obtained in step (f) may photocatalytically reduce $CO_2$ in pure water to produce CO. In some embodiments, the performance of the $Co_3(Ti)O_4$/H-ATP supported catalyst for $CO_2$ reduction may be evaluated by determining the CO production rate under simulated sunlight.

Embodiments of the present disclosure also provide a supported catalyst prepared by the method described above, and the supported catalyst is a $Co_3(Ti)O_4$/acidified attapulgite (H-ATP) composite.

Beneficial effects that may be achieved by embodiments of the present disclosure include, but are not limited to, the following.

(1) Carbothermal reduction of the waste lithium battery using the waste biomass can recover the cobalt and titanium active components, which promotes the recycling of the waste lithium battery, mitigates heavy metal pollution, and realizes the transformation of waste to treasure.

(2) Acid modification of the attapulgite can increase the size of its surface pore and specific surface area, which is favorable for the adsorption of $CO_2$ molecules.

(3) In the microwave-assisted hydrothermal reaction, $Ti^{4+}$-doped $Co_3O_4$ induces lattice defects on the surface of $Co_3O_4$, and the $Co_3(Ti)O_4$/H-ATP composite produces a Localized Surface Plasmon Resonance (LSPR) effect in the visible-near infrared region, which can effectively activate $CO_2$ molecules. The H-ATP has a great specific surface area and abundant active centers for capturing $CO_2$ molecules; the residual biochar produced by the waste biomass reduction of the LTCO forms a charge transfer channel to accelerate the transfer of electrons, which provides a new pathway for $CO_2$ adsorption and conversion.

The present disclosure is described in detail below in connection with specific examples. The following examples will be helpful to those skilled in the art to further understand the present disclosure, but do not limit the disclosure in any way. It should be noted that for a person skilled in the art, a number of adjustments and improvements may be made without departing from the conception of the present disclosure. These modifications all fall within the scope of protection of the present disclosure.

EXAMPLES

Example 1

(a) Performing pre-treatment including discharging, aluminum foil stripping, and sieving on waste lithium battery cathode material LTCO (i.e., a mixed cathode material of lithium cobaltate and lithium titanate) (commercially available) before putting into an oven for drying and spare; freeze-drying a fresh onion at a temperature of −45° C. for 8 h; after removal, grinding and sieving (a sieve aperture of 180 mesh) the freeze-dried onion for spare. Then mixing 3.0 g of the dried LTCO and 1.5 g of the sieved onion powder (a mass ratio of 1:0.5) uniformly to obtain a mixture and then putting the mixture into the oven at 100° C. for 2 h. Putting the dried mixture into a tube furnace for nitrogen purging for 15 min, and then heating the dried mixture to 600° C. at a heating rate of 10° C·min$^{-1}$ for 30 min to obtain a solid sample after carbothermal reduction treatment. Using wet separation technique to recover Co compounds and Ti compounds in the solid sample, and the experimental steps including as follows: hydrothermally stirring the solid sample after carbothermal reduction treatment at 80° C. for 6 h, followed by filtration to recover a residue, and drying the residue to obtain a mixed sample of $Co_3O_4$, $TiO_2$, and biochar, labeled as TCO.

(b) Ultrasonically dispersing 1.5 g of ATP in 75 mL of 3 mol·L$^{-1}$ hydrochloric acid solution and stirring in a water bath at 80° C. for 10 h to obtain a product. Washing the product until neutral, after filtering, putting the product into the oven for drying overnight to obtain an H-ATP.

(c) Ultrasonically dispersing 0.23 g of the TCO in a mixed solution of 60 mL deionized water and DMF (1:20), and adding 0.77 g of the H-ATP into the mixed solution. Putting the mixed solution into 100 mL of a microwave reactor and heating at 180° C. for 90 min. Then obtaining a sample after centrifuging and washing three times with deionized water, drying the sample in the oven at 80° C. for 12 h, and finally performing muffle calcination at 350° C. for 90 min to obtain an end product, labeled as $Co_3(Ti)O_4$-30%/H-ATP. 30% in $Co_3(Ti)O_4$-30%/H-ATP is the mass ratio of TCO to the H-ATP.

Under simulated sunlight and near-infrared light irradiation, production rates of CO generated by photocatalytic reduction of $CO_2$ in pure water using the $Co_3(Ti)O_4$-30%/

H-ATP composite are determined to be 14.7 $\mu mol \cdot g^{-1} \cdot h^{-1}$ and 4.8 $\mu mol \cdot g^{-1} \cdot h^{-1}$, respectively,.

The $Co_3(Ti)O_4$-30%/H-ATP composite prepared in Example 1 was analyzed by X-ray fluorescence spectroscopy (XRF), X-ray diffraction (XRD), and ultraviolet-visible (UV-Vis) spectrum, and the morphology and structure of the $Co_3(Ti)O_4$-30%/H-ATP composite were observed under Transmission Electron Microscopy (TEM).

Table 1 shows a result of XRF of $Co_3(Ti)O_4$-30%/H-ATP of Example 1. According to Table 1, the main composition of $Co_3(Ti)O_4$-30%/H-ATP includes $SiO_2$, $Al_2O_3$, MgO, and $Fe_2O_3$ in the ATP, and $Co_3O_4$ and $TiO_2$ in the waste lithium battery.

TABLE 1

| Component (wt %) | $Co_3(Ti)O_4$-30% H-ATP |
|---|---|
| $SiO_2$ | 65.55% |
| $Co_3O_4$ | 19.31% |
| $Al_2O_3$ | 5.96% |
| MgO | 4.91% |
| $Fe_2O_3$ | 2.35% |
| $TiO_2$ | 1.18% |

Figure 1:
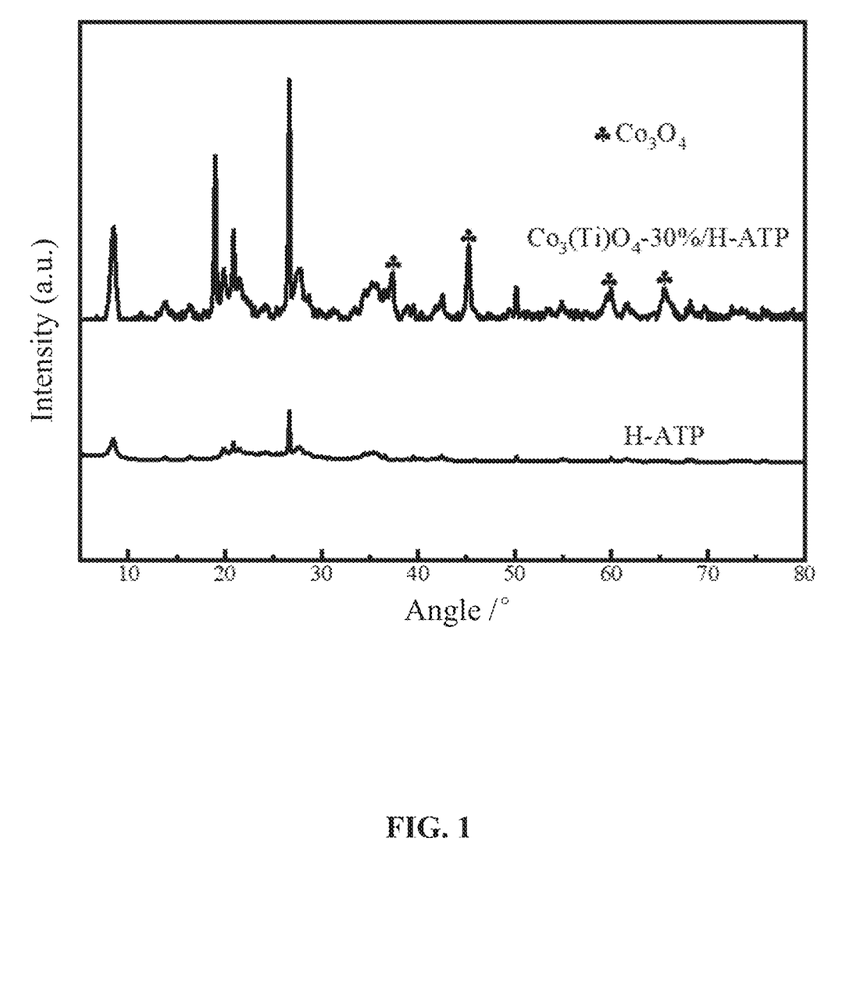
FIG. 1 is an X-ray diffraction (XRD) pattern of $Co_3(Ti)O_4$-30%/H-ATP according to Example 1 of the present disclosure.

FIG. 1 is an XRD pattern of $Co_3(Ti)O_4$-30%/H-ATP according to Example 1 of the present disclosure. For the XRD diffraction peaks of $Co_3(Ti)O_4$-30%/H-ATP, the diffraction peaks at 8.3°, 19.7°, and 26.6° may be attributed to the H-ATP, whereas there is no obvious characteristic peak of $TiO_2$, which may be contributed to the content of $TiO_2$ lower than 5% or $Ti^{4+}$ doped in the lattice of $Co_3O_4$. The diffraction peaks of $Co_3O_4$ are slightly shifted compared to its standard card PDF#42-1467, corresponding to 37.2°, 45.2°, 59.9°, and 65.5°, respectively, which further verifies the possibility of $Ti^{4+}$-doped $Co_3O_4$.

Figure 2:
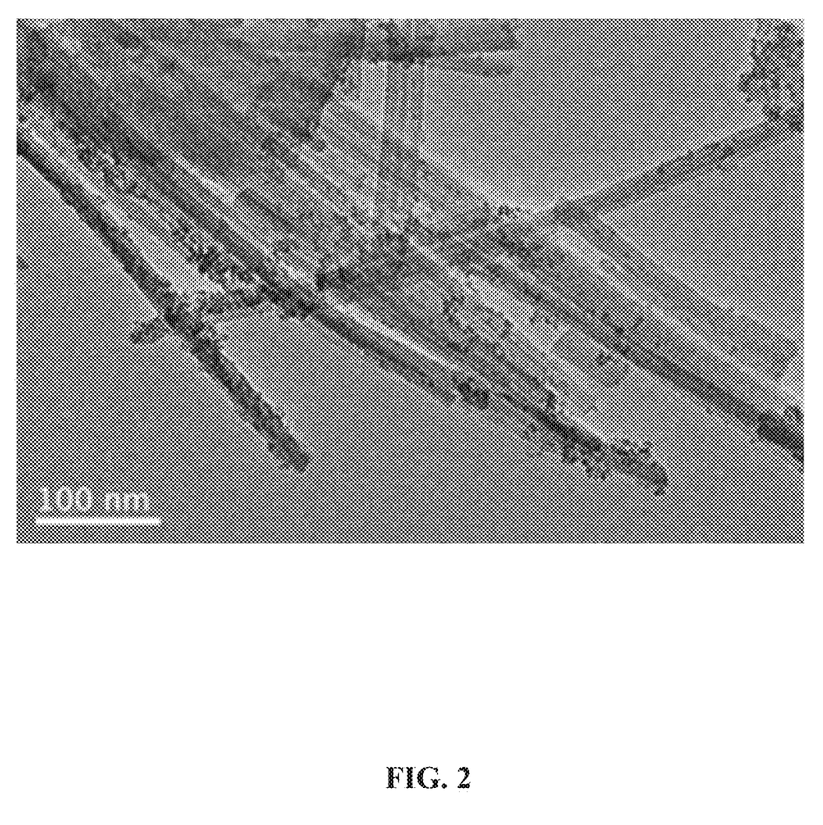
FIG. 2 is a transmission electron microscopy (TEM) image of Co$_3$(Ti)O$_4$-30%/H-ATP according to Example 1 of the present disclosure.

FIG. 2 is a TEM image of $Co_3(Ti)O_4$-30%/H-ATP according to Example 1 of the present disclosure. As shown in FIG. 2, the H-ATP is one-dimensional nanorods with a diameter of about 35 nm, on the surface of which uniform and dispersed $Co_3(Ti)O_4$ nanoparticles are grown, and almost all of the $Co_3(Ti)O_4$ nanoparticles have particle sizes of 1-5 nm.

Example 2

(a) Carbothermal reduction of LTCO was consistent with step (a) of Example 1.
(b) Modification of ATP was consistent with step (b) of Example 1.
(c) Ultrasonically dispersing 0.09 g of the TCO in 60 mL of a mixed solution of deionized water and DMF (1:10), and adding 0.91 g of H-ATP into the mixed solution. Putting the mixed solution into 100 mL of a microwave reactor and heating at 140° C. for 120 min. Then obtaining a sample after centrifuging and washing three times with deionized water, drying the sample in the oven at 80° C. for 12 h, and finally performing muffle calcination at 300° C. for 180 min to obtain an end product, labeled as $Co_3(Ti)O_4$-10%/H-ATP. 10% in $Co_3(Ti)O_4$-10%/H-ATP is the mass ratio of TCO to the H-ATP.

Under simulated sunlight, the production rate of CO generated by photocatalytic reduction of $CO_2$ in pure water using $Co_3(Ti)O_4$-10%/H-ATP composite is determined to be 9.8 $\mu mol \cdot g^{-1} - h^{-1}$.

Example 3

(a) Carbothermal reduction of LTCO was consistent with step (a) of Example 1.
(b) Modification of ATP was consistent with step (b) of Example 1.
(c) Ultrasonically dispersing 0.33 g of the TCO in 60 mL of a mixed solution of deionized water and DMF (1:30), and adding 0.67 g of the H-ATP into the mixed solution. Putting the mixed solution into 100 mL of a microwave reactor and heating at 180° C. for 60 min. Then obtaining a sample after centrifuging and washing three times with deionized water, drying the sample in the oven at 80° C. for 12 h, and finally performing muffle calcination at 400° C. for 60 min to obtain an end product, labeled as $Co_3(Ti)O_4$-50%/H-ATP. 50% in $Co_3(Ti)O_4$-50%/H-ATP is the mass ratio of the TCO to the H-ATP.

Under simulated sunlight irradiation, the production rate of CO generated by photocatalytic reduction of $CO_2$ in pure water using $Co_3(Ti)O_4$-50%/H-ATP composite is determined to be 10.9 $\mu mol \cdot g^{-1} \cdot h^{-1}$.

As shown in Examples 1, 2, and 3, for $Co_3(Ti)O_4$-x/H-ATP composite, the H-ATP mainly serves as a carrier for $Co_3(Ti)O_4$, and an acid treatment further increases the specific surface area and the number of active sites of ATP, which can improve the adsorption capacity of $CO_2$. The residual biochar produced by the carbothermal reduction of LTCO can form a channel on the surface of the H-ATP to accelerate electron transport, which accelerates the adsorption and activation of $CO_2$. The LSPR effect induced by the complexation of $Co_3(Ti)O_4$ deposited in-situ on the surface of ATP with H-ATP expands the absorption range to the infrared light region, releasing high-energy thermoelectrons, and at the same time, the generated additional heat raises the temperature of the catalyst surface, forming a high-temperature localization.

Example 4

(a) Performing pre-treatment including discharging, aluminum foil stripping, and sieving on LTCO before putting into an oven for drying and spare; then freeze-drying fresh lotus leaves at −30° C. for 12 h; after removal, grinding and sieving the freeze-dried lotus leaves for spare. Then mixing 3.0 g of the dried LTCO and 0.6 g of sieved lotus leaf powder (a mass ratio of 1:0.2) uniformly to obtain a mixture and then putting the mixture into the oven at 100° C. for 2 h. Putting the dried mixture into a tube furnace for nitrogen purging for 20 min, then heating the dried mixture to 500° C. at a heating rate of 5° $C \cdot min^{-1}$ and keep for 40 min to obtain a solid sample after carbothermal reduction treatment. Using wet separation technique to recover Co compounds and Ti compounds in the solid sample, and the experimental steps including as follows: hydrothermally stirring the solid sample after carbothermal reduction treatment at 80° C. for 6 h, followed by filtration to recover a residue, and drying the residue to obtain a mixed sample of $Co_3O_4$, $TiO_2$, and biochar.
(b) Modification of ATP was consistent with step (b) of Example 1.
(c) Preparation of $Co_3(Ti)O_4$/H-ATP using microwave hydrothermal method was consistent with step (c) of Example 1.

Under simulated sunlight irradiation, the production rate of CO generated by photocatalytic reduction of $CO_2$ in pure water using $Co_3(Ti)O_4$-30%/H-ATP composite of Example 4 is determined to be 11.9 $\mu mol \cdot g^{-1} \cdot h^{-1}$.

Example 5

(a) Performing pre-treatment including discharging, aluminum foil stripping, and sieving on LTCO before putting into an oven for drying and spare; then freeze-drying fresh pomegranate peels at −65° C. for 6 h; after removal, grinding and sieving the dried pomegranate peels for spare. Then mixing 3.0 g of the dried LTCO and 2.1 g of the sieved pomegranate peel powder (a mass ratio of 1:0.7) uniformly to obtain a mixture and then putting the mixture into the oven at 100° C. for 2 h. Putting the dried mixture into a tube furnace for nitrogen purging for 10 min, then heating the dried mixture to 700° C. at a heating rate of 10° C·min$^{-1}$ and holding for 20 min to obtain a solid sample after carbothermal reduction treatment. Using the wet separation technique to recover Co compounds and Ti compounds in the solid sample, and the experimental steps including as follows: hydrothermally stirring the solid sample after carbothermal reduction treatment at 80° C. for 6 h, followed by filtration to recover a residue, and drying the residue to obtain a mixed sample of $Co_3O_4$, $TiO_2$, and biochar.

(b) Modification of ATP was consistent with step (b) of Example 1.

(c) Preparation of $Co_3(Ti)O_4$/H-ATP using microwave hydrothermal method was consistent with step (c) of Example 1.

Under simulated sunlight irradiation, the production rate of CO generated by photocatalytic reduction of $CO_2$ in pure water using $Co_3(Ti)O_4$-30%/H-ATP composite in Example 5 is determined to be 12.3 µmol·g$^{-1}$·h$^{-1}$.

As shown in Examples 1, 4, and 5, a mass ratio of the LTCO to the biomass, a time and a temperature of carbothermal reduction treatment are key influencing factors for the recovery of cobalt compounds and titanium compounds, so catalysts prepared in Examples 1, 4, and 5 have slightly difference in the production rate of CO generated by the reduction of $CO_2$, but they all fall within the preferred range. When the time is too short and the temperature is too low (below 500° C.), the carbothermal reduction reaction is not complete, and the recovery rate of cobalt and titanium compounds is low. As the temperature rises, dry powder of the waste biomass is converted into biochar, and the gas-solid reaction is transformed to solid-solid carbothermal reduction, which promotes the recovery of Co compounds. However, when the time of the calcination is too long and the temperature of the calcination is too high (above 700° C.), solid-solid carbothermal reduction may reduce $Co^{2+}$ and $Co^{3+}$ in the LTCO to monomeric Co. In addition, a high temperature increases energy consumption, and $LiCO_3$ produced by carbothermal reduction of the LTCO is unstable at the high temperature, which easily leads to secondary pollution of Li.

Example 6

(a) Carbothermal reduction of LTCO was consistent with step (a) of Example 1.
(b) Modification of ATP was consistent with step (b) of Example 1.
(c) Ultrasonically dispersing 0.16 g of the TCO in 60 mL of a mixed solution of deionized water and DMF (1:10), and adding 0.8 g of the H-ATP into the mixed solution. Putting the mixed solution into 100 mL of a microwave reactor, and heating at 140° C. for 120 min. Then obtaining a sample after centrifuging and washing three times with deionized water, drying the sample in the oven at 80° C. for 12 h, and finally performing muffle calcination at 300° C. for 180 min to obtain an end product, labeled as $Co_3(Ti)O_4$-20%/H-ATP.

Under simulated sunlight irradiation, the production rate of CO generated by photocatalytic reduction of $CO_2$ in pure water using $Co_3(Ti)O_4$-10%/H-ATP composite is determined to be 9.9 µmol·g$^{-1}$·h$^{-1}$.

Example 7

(a) Carbothermal reduction of LTCO was consistent with step (a) of Example 1.
(b) Modification of ATP was consistent with step (b) of Example 1.
(c) Ultrasonically dispersing 0.33 g of the TCO in 60 mL of a mixed solution of deionized water and DMF (1:10), and adding 0.67 g of the H-ATP into the mixed solution. Putting the mixed solution into a 100 mL microwave reactor, and heating at 140° C. for 120 min. Then obtaining a sample after centrifuging and washing three times with deionized water, drying the sample in the oven at 80° C. for 12 h, and finally performing muffle calcination at 300° C. for 180 min to obtain an end product, labeled as $Co_3(Ti)O_4$-50%/H-ATP.

Under simulated sunlight irradiation, the production rate of CO generated by photocatalytic reduction of $CO_2$ in pure water using $Co_3(Ti)O_4$-10%/H-ATP composite is determined to be 10.2 µmol·g$^{-1}$·h$^{-1}$, in pure water.

Comparative Example 1

Modification of ATP was consistent with step (b) of Example 1. Differences of the subsequent loading process between Comparative Example 1 and Example 1 is that compared with step (c) of Example 1, the cobalt and titanium compounds recovered from LTCO was replaced with a mixture of analytical grade cobalt chloride and analytical grade titanium chloride, i.e., ultrasonically dispersing 10.32 g of cobalt chloride hexahydrate and 0.53 g of titanium chloride in 60 mL of a mixed solution of deionized water and DMF (1:20), and adding 0.77 g of the H-ATP into the mixed solution. Putting the mixed solution into 100 mL of a microwave reactor and heating at 180° C. for 90 min. Then obtaining a sample after centrifuging and washing three times with deionized water, drying the sample in the oven at 80° C. for 12 h, and finally performing muffle calcination at 350° C. for 90 min to obtain an end product, labeled as $P$-$Co_3(Ti)O_4$-30%/H-ATP.

Under simulated sunlight irradiation, the production rate of CO generated by photocatalytic reduction of $CO_2$ in pure water using $P$-$Co_3(Ti)O_4$-30%/H-ATP composite in Comparative Example 1 is determined to be only 2.5 µmol·g$^{-1}$·h$^{-1}$.

Compared with Example 1, the reduction performance of $P$-$Co_3(Ti)O_4$-30%/H-ATP composite on $CO_2$ in Comparative Example 1 is lower than that of $Co_3(Ti)O_4$-30%/H-ATP in Example 1. The reason may be that cobalt and titanium compounds recovered from the carbothermal reduction of waste lithium battery using onion powder contain biochar, which can form a channel on the surface of the H-ATP to accelerate the transfer of electrons and promote the adsorption and activation of $CO_2$. In addition, the cost of recovering TCO by carbothermal reduction of LTCO is much lower than that of analytical grade cobalt chloride and analytical grade titanium chloride.

Comparative Example 2

Comparative Example 2 was consistent with Example 1, except that 1 g of TCO obtained from the carbothermal reduction treatment was added and ATP was not added in step (c). Under simulated sunlight irradiation, the production rate of CO generated by photocatalytic reduction of $CO_2$ in pure water using $Co_3(Ti)O_4$ composite in Comparative Example 2 is determined to be 1.8 $\mu mol \cdot g^{-1} \cdot h^{-1}$.

Compared with Example 1, the reduction performance of $Co_3(Ti)O_4$ on $CO_2$ in Comparative Example 2 is much lower than that of $Co_3(Ti)O_4$-30%/H-ATP in Example 1. The reason may be that the H-ATP in Example 1 allows $Co_3(Ti)O_4$-30%/H-ATP composite to capture more $CO_2$ in the reaction process, thereby activating and converting more $CO_2$. In addition, $Co_3(Ti)O_4$ in Example 1 is better dispersed and more active on the H-ATP carrier, while $Co_3(Ti)O_4$ in Comparative Example 2 is prone to agglomeration and stacking, which is unfavorable for the exposure of active sites on its surface.

Comparative Example 3

Comparative Example 3 was consistent with Example 1, except that DMF was not added in step (c). Under simulated sunlight irradiation, the production rate of CO generated by photocatalytic reduction of $CO_2$ in pure water using $Co_3(Ti)O_4$-30%/H-ATP composite in Comparative Example 3 is determined to be 2.3 $\mu mol \cdot g^{-1} \cdot h^{-1}$.

Compared with Example 1, the reduction performance of $Co_3(Ti)O_4$/H-ATP composite on $CO_2$ in Comparative Example 3 is much lower than that of $Co_3(Ti)O_4$-30%/H-ATP in Example 1. The reason may be that DMF is not added in Comparative Example 3 such that $Ti^{4+}$ fails to be doped into $Co_3O_4$ lattice, which may be related to the nature of a solvent under the microwave hydrothermal condition. Under the microwave hydrothermal condition, microwaves make DMF molecules vibrate, and by generating an alternating electromagnetic field and utilizing a thermal effect of electromagnetic radiation, the temperature of the reaction system rises rapidly in a short time, which can effectively dissolve TCO and promote defect formation in $Ti^{4+}$-doped in $Co_3O_4$ lattice. $Co_3(Ti)O_4$ grows and nucleates in-situ on the surface of the H-ATP, finally forming a $Co_3(Ti)O_4$/H-ATP composite.

Figure 3A:
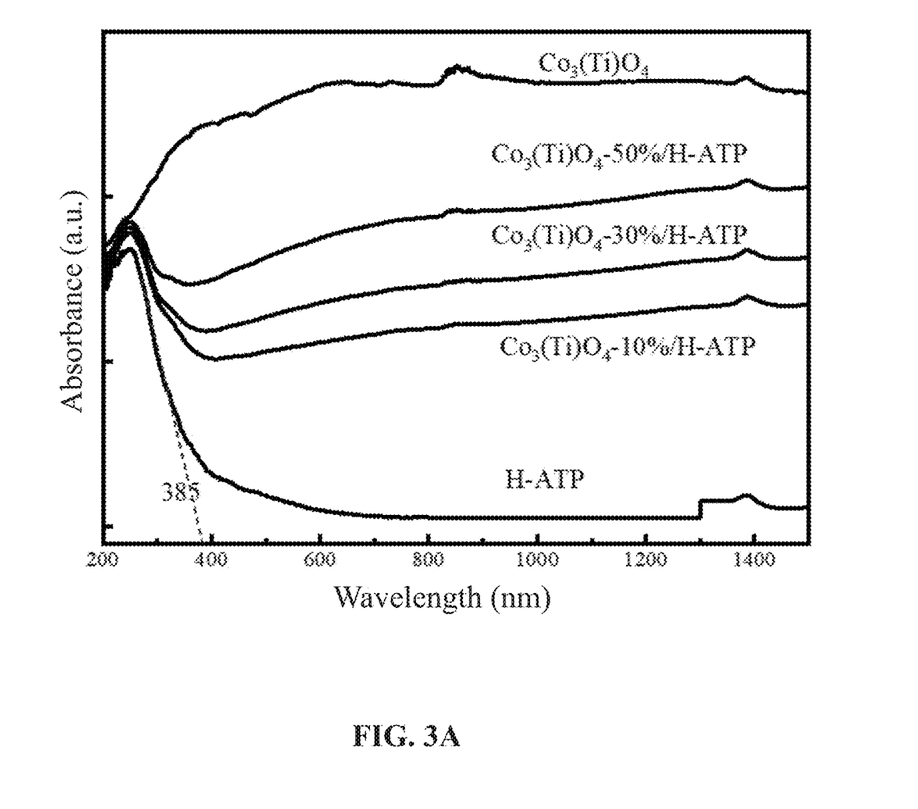
FIG. 3A is an Ultraviolet-Visible (UV-Vis) spectrum of H-ATP and Co$_3$(Ti)O$_4$-x/H-ATP according to Examples 1-3 of the present disclosure and Co$_3$(Ti)O$_4$ according to Comparative Example 2 of the present disclosure.
Figure 3B:
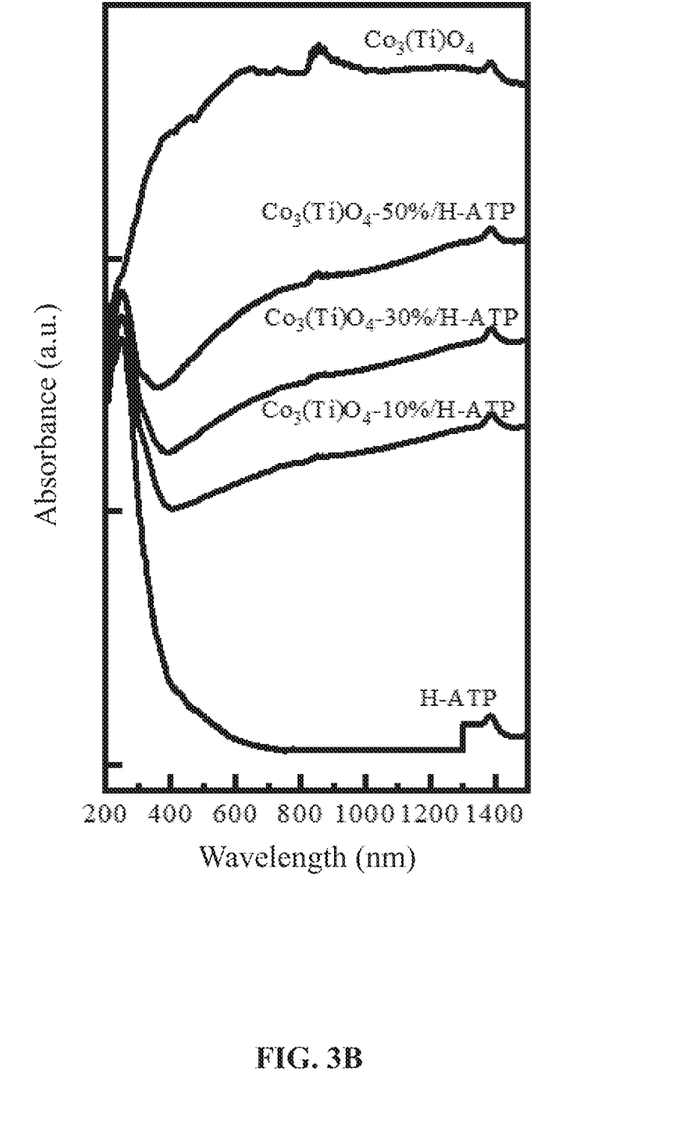
FIG. 3B is a scaled UV-Vis spectrum of H-ATP and Co$_3$(Ti)O$_4$-x/H-ATP according to Examples 1-3 of the present disclosure and Co$_3$(Ti)O$_4$ according to Comparative Example 2 of the present disclosure; wherein x in Co$_3$(Ti)O$_4$-x/H-ATP denotes a mass ratio of TCO to H-ATP.

FIG. 3A is a UV-Vis spectrum of H-ATP and $Co_3(Ti)O_4$-x/H-ATP according to Examples 1-3 of the present disclosure and $Co_3(Ti)O_4$ according to Comparative Example 2 of the present disclosure; FIG. 3B is a scaled UV-Vis spectrum of H-ATP and $Co_3(Ti)O_4$-x/H-ATP according to Examples 1-3 of the present disclosure and $Co_3(Ti)O_4$ according to Comparative Example 2 of the present disclosure; wherein x in $Co_3(Ti)O_4$-x/H-ATP denotes a mass ratio of TCO to H-ATP. The light absorption of H-ATP is at 385 nm at the edge of the ultraviolet light range. When the H-ATP is complexed with $Co_3(Ti)O_4$, the light absorption of $Co_3(Ti)O_4$-x/H-ATP extends to the visible-IR region, and the localized plasmonic resonance effect expands the utilization of sunlight, as shown in FIG. 3B.

The foregoing is only a part of the embodiments of the present disclosure, and is not intended to limit the present disclosure, and any modifications, equivalent substitutions, improvements, etc. made within the spirit and principles of the present disclosure shall be included in the scope of protection of the present disclosure.

What is claimed is:
1. A method for preparing a supported catalyst using a waste lithium battery and attapulgite, comprising:

(a) performing pre-treatment including discharging, aluminum foil stripping, and sieving on waste lithium battery cathode material before putting into an oven for drying and spare;
(b) freeze-drying waste biomass, after removal, grinding and sieving on the freeze-dried waste biomass for spare;
(c) mixing the dried waste lithium battery cathode material in step (a) and the sieved biomass in step (b) uniformly to obtain a mixture, then putting the mixture into a tube furnace for nitrogen purging, and then heating and calcining, to obtain a solid sample after carbothermal reduction treatment;
(d) hydrothermally stirring the solid sample after the carbothermal reduction treatment, followed by filtration to recover a residue, and drying the residue to obtain a mixed sample of $Co_3O_4$, $TiO_2$, and biochar, labeled as TCO;
(e) ultrasonically dispersing the attapulgite in an acid solution for modification and stirring in a water bath at 80° C. to obtain a product, washing the product until neutral, filtering, and then drying in the oven overnight to obtain an acidified attapulgite (H-ATP); and
(f) weighing the TCO, ultrasonically dispersing the TCO in a mixed solution of deionized water and N, N dimethylformamide (DMF), adding the H-ATP into the mixed solution, and performing a microwave hydrothermal reaction, obtaining a sample after centrifuging, washing, and drying, and then performing muffle calcination on the sample to obtain a supported catalyst $Co_3(Ti)O_4$/H-ATP.

2. The method for preparing the supported catalyst using the waste lithium battery and the attapulgite of claim 1, wherein the waste lithium battery cathode material in step (a) is a lithium secondary battery cathode material of a rechargeable treasure or a cell phone battery, and a composition of the lithium secondary battery cathode material includes $LiCoO_2$ and $Li_4Ti_5O_{12}$.

3. The method for preparing the supported catalyst using the waste lithium battery and the attapulgite of claim 1, wherein the waste biomass in step (b) includes at least one of an onion, a lotus leaf, and a pomegranate peel, a temperature of the freeze-drying is within a range of (−60)-(−30)° C., and a time of the freeze-drying is within a range of 6-12 h.

4. The method for preparing the supported catalyst using the waste lithium battery and the attapulgite of claim 1, wherein a mass ratio of the dried waste lithium battery cathode material and the sieved biomass in step (c) is 1:(0.2-0.7), a time of the nitrogen purging is within a range of 10-20 min, a heating rate of the heating and calcining is within a range of 2-15° $C \cdot min^{-1}$, and a temperature of the carbothermal reduction treatment is within a range of 500-700° C.

5. The method for preparing the supported catalyst using the waste lithium battery and the attapulgite of claim 1, wherein a time of the hydrothermal stirring in step (d) is within a range of 5-15 h, and a temperature of the hydrothermal stirring is within a range of 60-80° C.

6. The method for preparing the supported catalyst using the waste lithium battery and the attapulgite of claim 1, wherein the acid solution for modification in step (e) includes at least one of hydrochloric acid, nitric acid, and phosphoric acid.

7. The method for preparing the supported catalyst using the waste lithium battery and the attapulgite of claim 1, wherein the TCO in step (f) accounts for 10%-50% of a mass of the H-ATP, and a volume ratio of the deionized water to the DMF is 1:(10-30).

8. The method for preparing the supported catalyst using the waste lithium battery and the attapulgite of claim 1, wherein a temperature of the microwave hydrothermal reaction in step (f) is within a range of 140-180° C., and a time of the microwave hydrothermal reaction is within a range of 60-120 min; and a temperature of the muffle calcination is within a range of 300-400° C., and a time of the muffle calcination is within a range of 60-180 min.

9. A supported catalyst, which is prepared by the method of claim 1, wherein the supported catalyst is a $Co_3(Ti)O_4$/acidified attapulgite (H-ATP) composite.

* * * * *